US012631245B2

(12) United States Patent
Deng et al.

(10) Patent No.: US 12,631,245 B2
(45) Date of Patent: May 19, 2026

(54) GEARBOX AND VEHICLE

(71) Applicant: TOP GEAR POWERTRAIN TECHNOLOGY CO., LTD., Shanghai (CN)

(72) Inventors: Yueyue Deng, Shanghai (CN); Jing Deng, Shanghai (CN); Haifeng Lu, Shanghai (CN); Xiangyang Zhao, Shanghai (CN); Shan Li, Shanghai (CN); Kun Xu, Shanghai (CN)

(73) Assignee: TOP GEAR POWERTRAIN TECHNOLOGY CO., LTD., Shanghai (CN)

( * ) Notice: Subject to any disclaimer, the term of this patent is extended or adjusted under 35 U.S.C. 154(b) by 149 days.

(21) Appl. No.: 18/682,153

(22) PCT Filed: Mar. 10, 2023

(86) PCT No.: PCT/CN2023/080734
§ 371 (c)(1),
(2) Date: Feb. 8, 2024

(87) PCT Pub. No.: WO2024/152427
PCT Pub. Date: Jul. 25, 2024

(65) Prior Publication Data
US 2025/0129841 A1     Apr. 24, 2025

(30) Foreign Application Priority Data

Jan. 17, 2023   (CN) .......................... 202310079596.8

(51) Int. Cl.
*F16H 57/023*          (2012.01)
*F16H 61/04*           (2006.01)
(Continued)

(52) U.S. Cl.
CPC ........... *F16H 57/023* (2013.01); *F16H 61/04* (2013.01); *F16H 61/32* (2013.01); *F16H 2057/02034* (2013.01); *F16H 2061/0433* (2013.01)

(58) Field of Classification Search
CPC . B60K 1/02; F16H 2057/02034; F16H 61/32; F16H 3/32; F16H 37/06
See application file for complete search history.

(56) References Cited

U.S. PATENT DOCUMENTS

| | | | |
|---|---|---|---|
| 2001/0042416 A1 | 11/2001 | Suzuki et al. | |
| 2009/0019967 A1 | 1/2009 | Himmelmann | |
| 2018/0106329 A1 | 4/2018 | Hopkins et al. | |

FOREIGN PATENT DOCUMENTS

| | | |
|---|---|---|
| CN | 102840309 A | 12/2012 |
| CN | 207207728 U | 4/2018 |

(Continued)

OTHER PUBLICATIONS

The First Office Action,Application No. CN2023100795968Mail Date Mar. 20, 2025.

(Continued)

*Primary Examiner* — Randell J Krug
(74) *Attorney, Agent, or Firm* — IPro, PLLC; Na Xu

(57)          ABSTRACT

The present disclosure provides a gearbox and a vehicle, and relates to the field of vehicles technologies. The gearbox includes an output shaft and two drive assemblies, wherein each of the two drive assemblies is used to drive the output shaft; the drive assembly includes an electric machine, a reduction gear set, and a gear transmission assembly in transmission connection with the output shaft, and the electric machine is in transmission connection with the gear transmission assembly through the reduction gear set; the gear transmission assembly includes at least three gear pairs, and transmission ratios of respective gear pairs in the at least (Continued)

three gear pairs are different; and in response to the gearbox being in a first transmission mode, the reduction gear set is in transmission connection with the output shaft through one of the at least three gear pairs.

16 Claims, 5 Drawing Sheets

(51) Int. Cl.
F16H 61/32 (2006.01)
F16H 57/02 (2012.01)

(56) References Cited

FOREIGN PATENT DOCUMENTS

| | | | |
|---|---|---|---|
| CN | 108361327 | A | 8/2018 |
| CN | 110332287 | A | 10/2019 |
| CN | 110594369 | A | 12/2019 |
| CN | 113027998 | A * | 6/2021 ............... B60K 1/02 |
| CN | 215244341 | U * | 12/2021 |
| CN | 216789212 | U | 6/2022 |
| CN | 114738447 | A | 7/2022 |
| CN | 115560039 | A | 1/2023 |
| DE | 102010028079 | A1 | 10/2011 |
| DE | 102010030570 | A1 | 12/2011 |
| DE | 102010030572 | A1 | 12/2011 |
| DE | 102014213459 | A1 | 1/2016 |
| DE | 102019218239 | A1 | 5/2021 |
| EP | 2450597 | A1 | 5/2012 |
| WO | 2015093474 | A1 | 6/2015 |

OTHER PUBLICATIONS

The Office Action, Application No. CN 112023000164.2Mail Date May 13, 2025.

* cited by examiner

| | | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|---|
| | | Neutral gear | High gear | Neutral gear | High gear | Middle gear | Neutral gear | Low gear | Middle gear | Neutral gear | Low gear |
| Combination 1 | Neutral gear | √ | - | √ | - | - | √ | - | - | √ | - |
| Combination 2 | First gear | √ | - | √ | - | - | - | √ | - | - | √ |
| Combination 3 | Transition | √ | - | √ | - | - | - | √ | - | √ | - |
| Combination 4 | Second gear | √ | - | √ | - | - | - | √ | √ | - | - |
| Combination 5 | Transition | √ | - | √ | - | - | √ | - | √ | - | - |
| Combination 6 | Third gear | √ | - | √ | - | √ | - | - | √ | - | - |
| Combination 5 | Transition | √ | - | √ | - | - | √ | - | √ | - | - |
| Combination 7 | Fourth gear | - | √ | √ | - | - | √ | - | √ | - | - |
| Combination 8 | Transition | - | √ | √ | - | - | √ | - | - | √ | - |
| Combination 9 | Fifth gear | - | √ | - | √ | - | √ | - | - | √ | - |
| Combination 10 | Neutral gear | √ | - | √ | - | - | √ | - | - | √ | - |
| Notes: "√" represents that the gear is engaged, "-" represents that the gear is not engaged, and a bold frame represents that changing positions of the sliding sleeves in a previous state and a later state | | | | | | | | | | | |

FIG. 4

| | | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|---|
| | | Neutral gear | High gear | Neutral gear | High gear | Middle gear | Neutral gear | Low gear | Middle gear | Neutral gear | Low gear |
| Combination 1 | Neutral gear | √ | - | √ | - | - | √ | - | - | √ | - |
| Combination 2 | First gear | √ | - | √ | - | - | - | √ | - | - | √ |
| Combination 3 | Second gear | √ | - | √ | - | √ | - | - | √ | - | - |
| Combination 4 | Third gear | - | √ | - | √ | - | √ | - | - | √ | - |

Notes: "√" represents that the gear is engaged, "-" represents that the gear is not engaged, and a bold frame represents that changing positions of the sliding sleeves in a previous state and a later state

FIG. 5

GEARBOX AND VEHICLE

FIELD OF THE INVENTION

The present disclosure relates to the field of vehicles, and in particular to a gearbox and a vehicle.

BACKGROUND OF THE INVENTION

In the prior art, conventional fuel vehicles and hybrid electric vehicles use a multi-gear gearbox to realize functions of speed change and torque change during driving.

For new energy pure electric vehicles, there are generally two routes to realize speed change. For example, for passenger cars, an electric machine can be used to realize speed change and a reducer with single speed ratio can be used to realize the function of increasing the torque by using characteristics of a large speed change range when the electric machine is at constant power; and for commercial vehicles, especially heavy trucks, the functions of speed change and torque change can be realized by using the electric machine and a less-gear gearbox.

At present, most of these gearboxes only have one power input source, it is difficult to realize the function of uninterrupted power during a shifting process, resulting in uneven shifting and reduced driving comfort. In addition, in application scenarios such as climbing and shifting, the vehicles will slide down due to power interruption when climbing, thereby causing a potential safety hazard.

SUMMARY OF THE INVENTION

In order to solve the above-mentioned technical problems, the present disclosure provides a gearbox and a vehicle.

According to one aspect of the present disclosure, there is provided a gearbox, being applicable to new energy automobiles without power interruption, including an output shaft and two drive assemblies, wherein each of the two drive assemblies is used to drive the output shaft;

the drive assembly includes an electric machine, a reduction gear set, and a gear transmission assembly in transmission connection with the output shaft, and the electric machine is in transmission connection with the gear transmission assembly through the reduction gear set;

the gear transmission assembly includes at least three gear pairs, and transmission ratios of respective gear pairs in the at least three gear pairs are different; and in response to the gearbox being in a first transmission mode, the reduction gear set is in transmission connection with the output shaft through one of the at least three gear pairs.

According to at least one embodiment of the present disclosure, the two drive assemblies are symmetrically arranged with respect to a central axis of the output shaft.

According to at least one embodiment of the present disclosure, the drive assembly further includes a shift shaft and an intermediate shaft parallel to the shift shaft;

at least part of gears in the reduction gear set are arranged on the intermediate shaft; and the shift shaft and an input shaft of the electric machine are coaxially arranged, and the input shaft of the electric machine is in transmission connection with the shift shaft through the reduction gear set and the intermediate shaft.

According to at least one embodiment of the present disclosure, an end of the intermediate shaft facing away from the reduction gear set is used to transmit power to the power take-off.

According to at least one embodiment of the present disclosure, the drive assembly includes at least two sliding sleeve shift mechanisms, and the at least two sliding sleeve shift mechanisms are slidably sleeved on the shift shaft;

in response to the gearbox being in the first transmission mode, one of the at least two sliding sleeve shift mechanisms is in transmission connection with a corresponding gear pair in the at least three gear pairs; and in response to the gearbox being in a second transmission mode, for one of the two drive assemblies, the at least two sliding sleeve shift mechanisms are in transmission disconnection with the at least three gear pairs.

According to at least one embodiment of the present disclosure, each of the at least two sliding sleeve shift mechanisms includes a sliding sleeve and a shift fork, and the sliding sleeve is slidably sleeved on the shift shaft; and the shift fork is used to drive the sliding sleeve to be in transmission connection with the gear arranged on the shift shaft in the corresponding gear pair in the first transmission mode, and to drive the sliding sleeve to be in transmission disconnection with the gear arranged on the shift shaft in the corresponding gear pair in the second transmission mode.

According to at least one embodiment of the present disclosure, each of the at least two sliding sleeve shift mechanisms further includes a shift fork shaft arranged in parallel with the shift shaft, and the shift fork is slidably sleeved on the shift fork shaft.

According to at least one embodiment of the present disclosure, the gearbox further includes a shift control unit electrically connected to the sliding sleeve shift mechanism, the shift control unit includes a controller and a shifter electrically connected to the sliding sleeve shift mechanism, and the controller communicates with the shifter.

According to at least one embodiment of the present disclosure, the shift shaft includes a first shaft section and a second shaft section coaxially arranged with the first shaft section, and a gear of the gear pair arranged on the second shaft section has a bearing hole for supporting an end of the second shaft section; and at least one of the at least two sliding sleeve shift mechanisms is slidably arranged at a position of the first shaft section close to the second shaft section.

Compared to prior art, the gearbox provided in the embodiments of the present disclosure includes the output shaft and two drive assemblies, each of the two drive assemblies is used to drive the output shaft; the drive assembly includes the electric machine, the reduction gear set, and the gear transmission assembly in transmission connection with the output shaft, and the electric machine is in transmission connection with the gear transmission assembly through the reduction gear set; the gear transmission assembly includes at least three gear pairs with different transmission ratios, and transmission paths of the gearbox with different speed ratios can be obtained by switching different gear pairs. Since the gearbox uses two electric machines for power input, there are two independent power transmission routes, respectively. Except that the two power transmission routes converge on the output shaft, when one power transmission route shifts the gear, the power of the other power transmission route continues to be transmitted, and no power interruption can be realized during a shifting gap. Therefore, the driving comfort can be improved during a shifting process, and vehicles will not slide down due to power interruption when climbing, resulting in high safety.

Another object of the present disclosure is to further provide a vehicle including above-mentioned gearbox.

The advantages of the vehicle and the prior art are the same as those of the gearbox and the prior art, which will not be repeated here.

BRIEF DESCRIPTION OF DRAWINGS

The accompanying drawings illustrate exemplary embodiments of the present disclosure and are used to explain the principles of the present disclosure in conjunction with corresponding description, the accompanying drawings provide a further understanding of the present disclosure and are incorporated in and constitute a part of this specification.

FIG. 4 is a schematic diagram of a combination of high and low gears for a five-gear gearbox.

FIG. 5 is a schematic diagram of a combination of high and low gears for a thredd-gear gearbox.

DETAILED DESCRIPTION OF THE INVENTION

Figure 1:
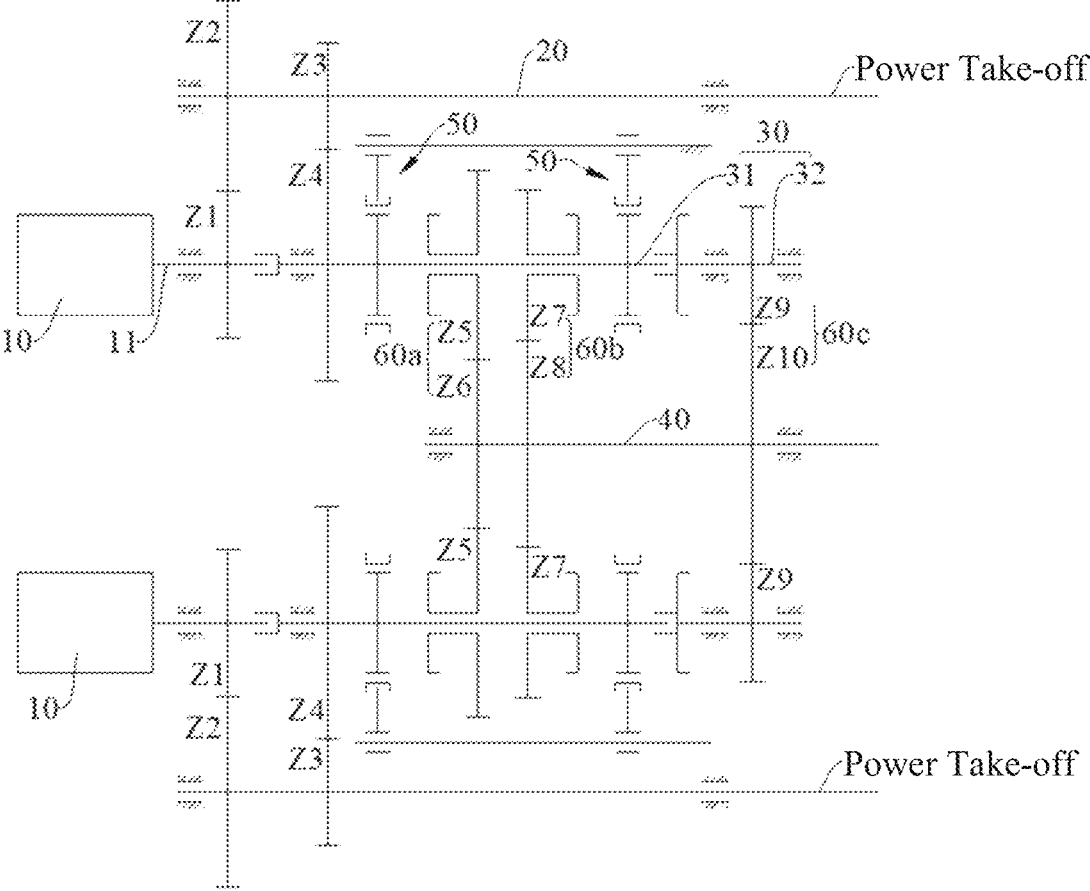
FIG. 1 is a schematic structural diagram of a gearbox according to an embodiment of the present disclosure.

The present disclosure will be clearly and completely described below with reference to the accompanying drawings and specific embodiments. It can be understood that the embodiments described here are only used to illustrate relative contents rather than limiting the scope of the present disclosure. In addition, it should also be noted that, only the parts related to the present disclosure are shown in the drawings for the convenience of description.

It should be noted that the embodiments of the present disclosure and the features of the embodiments may be combined with each other if there is no conflict. The present disclosure will be described in detail below with reference to the accompanying drawings in conjunction with the embodiments.

In the prior art, there may be power interruption during a shifting process of a gearbox of a vehicle, resulting in reduced driving comfort. In addition, the vehicle will slide down due to power interruption when climbing, causing a potential safety hazard.

According to an embodiment of the present disclosure, there is provided a gearbox being applicable to new energy automobiles without power interruption. As shown in FIG. 1, the gearbox includes an output shaft 40 and two drive assemblies, wherein each of the two drive assemblies is used to drive the output shaft 40; the drive assembly includes an electric machine 10, a reduction gear set, and a gear transmission assembly in transmission connection with the output shaft 40, and the electric machine 10 is in transmission connection with the gear transmission assembly through the reduction gear set; the gear transmission assembly includes at least three gear pairs, and transmission ratios of respective gear pairs in the at least three gear pairs are different; and in response to the gearbox being in a first transmission mode, the reduction gear set is in transmission connection with the output shaft 40 through one of the at least three gear pairs.

In actual use, the output shaft 40 of the gearbox is driven by two independent drive assemblies, so that power is interrupted when one of the two independent drive assemblies shifts, while the other drive assembly is still connected to the output shaft 40. Therefore, for the output shaft 40, there will be no interruption of power output in the prior art, thereby maintaining continuous power output. Under normal driving conditions, two independent drive assemblies provide power to the output shaft 40 respectively, so that two power transmission routes converge to the output shaft 40. Two drive assemblies have the same structure, and in the embodiment of the present disclosure, taking one or two of the drive assemblies as an example to describe. Each of the two drive assemblies includes the electric machine 10, the reduction gear set and the gear transmission assembly in transmission connection with the output shaft 40. The gear transmission assembly includes three gear pairs, for example, a gear pair 60a, a gear pair 60b and a gear pair 60c in FIG. 1. It can be understood that the number of the gear pairs is not limited to three, and the number of corresponding gear pairs can be increased or decreased according to a transmission ratio required by the gearbox. Taking a transmission path of a drive assembly as an example, when the gearbox is in a first transmission mode, that is, when the vehicle is running normally without shifting, the power of the electric machine 10 is transmitted to the reduction gear set, and the power of the reduction gear set is transmitted to a corresponding gear pair through the deceleration and torque increase of the reduction gear set. Since transmission ratios of respective gear pairs are different, the gear pair for transmitting the power can be determined according to the actual required transmission ratio. Further, the power of the corresponding gear pair is transmitted to the output shaft 40, and then the power is output to wheels, thereby driving the vehicle to run normally.

In an exemplary embodiment, the above two drive assemblies are symmetrically arranged with respect to a central axis of the output shaft 40. Since the two drive assemblies symmetrically arranged have the same structural characteristics, the center of gravity of the gearbox can be more stable, and the gearbox can be more stably arranged on the vehicle; and further, the gearbox is not easy to be damaged. The symmetrically arranged structure makes it easier for the gear pair or the reduction gear set to form a transmission connection with the output shaft 40, therefore, the design of the structure is more exquisite and practical.

As shown in FIG. 1, the drive assembly further includes a shift shaft 30 and an intermediate shaft 20 parallel to the shift shaft 30, the shift shaft 30 and an input shaft 11 of the electric machine 10 are coaxially arranged, and the input shaft 11 of the electric machine 10 is in transmission connection with the shift shaft 30 through the reduction gear set and the intermediate shaft 20. An end of the above input shaft 11 is designed with splines for connecting with the electric machine 10, two ends of the input shaft 11 are designed with bearing positions, and the input shaft 11 is rotatably supported on a housing and the shift shaft 30 through bearings. It can be understood that the above input shaft 11 is designed with an oil seal position for dynamic sealing between the input shaft 11 and the housing. The reduction gear set includes two gears arranged on the intermediate shaft 20, and a gear arranged on the input shaft 11 and a gear arranged on the shift shaft 30 are respectively in meshed connection with corresponding gears arranged on the intermediate shaft 20. The shift shaft 30 is coaxially arranged with the input shaft 11 of the electric machine 10, that is, the shift shaft 30 is disconnected from the input shaft 11, and the power transmission between the shift shaft 30 and the input shaft 11 is carried out through the reduction gear set.

For example, the power transmission process of the above-mentioned reduction gear set is as follows. A gear Z1 is arranged on the input shaft 11 of the electric machine 10, a gear Z2 and a gear Z3 are arranged on the intermediate shaft 20, and a gear Z4 is arranged on the shift shaft 30. The gear Z1 meshes with the gear Z2, and the gear Z3 meshes with the gear Z4, therefore, a power transmission path for the deceleration and torque increase is from the gear Z1, the gear Z2, the gear Z3 to the gear Z4, and power is transmitted from the electric machine 10 to the shift shaft 30. The reduction gear set of another drive assembly also has the same structure and power transmission process.

Two ends of the intermediate shaft 20 are designed with bearing positions, and the intermediate shaft 20 is rotatably supported on the housing through bearings. An end of the intermediate shaft 20 facing away from the reduction gear set is used to transmit power to the power take-off. That is, a tail end of the intermediate shaft 20 is designed with splines, and the power can be transmitted to the power take-off through the splines for power take-off of a hydraulic pump device or an air pump device on the vehicle.

In order to realize the switching of different speed ratios of the gearbox, in the above-mentioned gearbox, the drive assembly includes at least two sliding sleeve shift mechanisms 50, and the at least two sliding sleeve shift mechanisms 50 are slidably sleeved on the shift shaft 30; in response to the gearbox being in the first transmission mode, one of the at least two sliding sleeve shift mechanisms 50 is in transmission connection with a corresponding gear pair in the at least three gear pairs; and in response to the gearbox being in a second transmission mode, for one of the two drive assemblies, the at least two sliding sleeve shift mechanisms 50 are in transmission disconnection with the at least three gear pairs.

It can be understood that the number of sliding sleeve shift mechanisms 50 can be determined according to the actual number of gear pairs. In the embodiment of the present disclosure, taking three gear pairs as an example to describe, and two sliding sleeve shift mechanisms 50 are required. When the gearbox is in the first transmission mode, one of the at least two sliding sleeve shift mechanisms 50 is in transmission connection with a corresponding gear pair, and correspondingly, the other two gear pairs are both in transmission disconnection with the sliding sleeve shift mechanisms 50. The sliding sleeve shift mechanisms 50 in the other drive assembly are also in the same state as the above-mentioned drive assembly.

When the gearbox is in a second transmission mode, that is, when the gearbox is in a shifting gap, one of the two sliding sleeve shift mechanisms 50 in one of the two drive assemblies is in transmission connection with the corresponding gear pair, while for the other drive assembly, either of the two sliding sleeve shift mechanisms 50 is in transmission disconnection with the gear pair, that is, one drive assembly carries out normal power transmission, while the other drive assembly interrupts power transmission, that is, an intermediate gap of shifting.

In an exemplary embodiment, each of the at least two sliding sleeve shift mechanisms 50 includes a sliding sleeve 51 and a shift fork 52, and the sliding sleeve 51 is slidably sleeved on the shift shaft 30. Specifically, the shift shaft 30 has an external spline matched with the sliding sleeve 51, and an inner hole of the sliding sleeve 51 has an internal spline that can slide axially on the external spline of the shift shaft 30. The two ends of the sliding sleeve 51 are designed with splines for bonding with the gears of the corresponding gear pair located on the shift shaft 30, so as to transmit the power of the shift shaft to the corresponding gears. In the middle of an outer circle of the sliding sleeve 51, a groove is designed for inserting the shift fork 52, so that the shift fork 52 can control the axial sliding of the sliding sleeve 51 to realize the function of shifting. The shift fork 52 is used to drive the sliding sleeve 51 to be in transmission connection with the gear in the corresponding gear pair located on the shift shaft 30 in the first transmission mode; and to drive the sliding sleeve 51 to be in transmission disconnection with the gear in the corresponding gear pair located on the shift shaft 30 in the second transmission mode.

In order to facilitate the control of shifting, the sliding sleeve shift mechanism 50 further includes a shift fork shaft arranged in parallel with the shift shaft 30, and the shift fork 52 is slidably sleeved on the shift fork shaft. The shift fork shaft can control each shift fork 52 to reciprocate along the same axial direction, so that the corresponding sliding sleeve 51 is bonded with the gear located on the shift shaft 30 in each gear pair.

In order to show the shifting process more conveniently, as an example, the three gear pairs are specifically arranged as follows. For a gear pair 60a, a high gear Z5 arranged on the shift shaft 30 meshes with a gear Z6 arranged on the output shaft 40, and the gear Z5 and the gear Z6 form a high gear pair 60a. A neutral gear Z7 arranged on the shift shaft 30 meshes with a gear Z8 arranged on the output shaft 40, and the gear Z7 and the gear Z8 form a neutral gear pair 60b. A low gear Z9 arranged on the shift shaft 30 meshes with a gear Z10 arranged on the output shaft 40, and the gear Z9 and the gear Z10 form a low gear pair 60c. The gear Z5, the gear Z7 and the gear Z9 have splines that are bonded with the splines of the corresponding sliding sleeves. As an example, the above gears are hollow in structure, with smooth inner holes and two end faces, and are coaxially arranged on support positions of the shift shaft 30 through bearings and freely rotate on the shift shaft. When the corresponding sliding sleeves are bonded with the gears, the power of the shift shaft 30 can be transmitted to the output shaft 40.

In an alternative embodiment, the shift shaft 30 includes a first shaft section 31 and a second shaft section 32 coaxially arranged with the first shaft section 31, and a gear of the gear pair 60 arranged on the second shaft section 32 has a bearing hole for supporting an end of the second shaft section 32; and at least one of the at least two sliding sleeve shift mechanisms is slidably arranged at a position of the first shaft section 31 close to the second shaft section 32. Described from another angle, the shift shaft 30 can be divided into two disconnected shaft sections, the second shaft section 32 is provided with a gear of a gear pair 60c, and the first shaft section 31 is provided with the gears of the other two gear pairs 60a and 60b. As an example, the low gear Z9 is provided on the second shaft section 32 and has a bearing hole, and an end of the second shaft section 32 is supported in the bearing hole of the gear Z9. A sliding sleeve shift mechanism is slidably arranged at a position of the first shaft section 31 close to the second shaft section 32, so that the sliding sleeve shift mechanism can slide between the gear Z7 and the gear Z9, and then switch between a middle gear and a low gear. Specifically, the shift fork 52 of the sliding sleeve shift mechanism includes two parallel fork angles, which are inserted into a groove of a middle and low shift sliding sleeve during installation to shift the middle and low shift sliding sleeve, so that the middle and low shift sliding sleeve can slide along an axial direction of the shift shaft 30.

The low gear Z9 is arranged on the second shaft section 32, and the second shaft section 32 is disconnected from the first shaft section 31, on the one hand, in order to realize the realization of production technology; on the other hand, since two ends of the second shaft section 32 need the bearing to support, for the gear Z9 with the greatest stress, the support at two ends of the second shaft section 32 meets the support stiffness of the gear Z9, thereby obviously reducing the failure rate of the gearbox.

In some embodiments, the gearbox further includes a shift control unit electrically connected to the sliding sleeve shift mechanism 50, the shift control unit includes a controller and a shifter electrically connected to the sliding sleeve shift mechanism 50, and the controller communicates with the shifter. By using the controller in the shift control unit to control the shifter, the power transmission of the gearbox with different gears can be realized. In the embodiment of the present disclosure, two drive electric machines and two independent power transmission routes are adopted, and the two power transmission routes converge on the output shaft and output together. As long as the control logic is satisfied, when one power transmission route has a short power interruption during the shifting process, the other power transmission route continues to transmit power all the time, so that the function of no power interruption can be realized.

The specific operation and implementation principle of the power transmission of the above gearbox are as follows.

Figure 2:
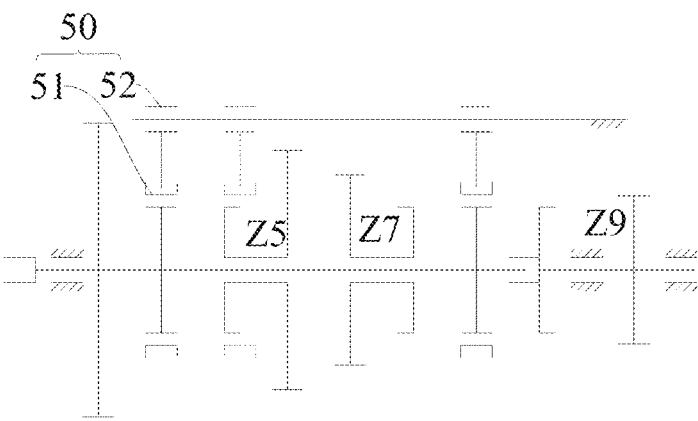
FIG. 2 is a schematic structural diagram of a high gear shifting of a gearbox according to an embodiment of the present disclosure.

As shown in FIG. 2, the sliding sleeve 51 corresponding to the high gear Z5 has two combined states, namely, the neutral gear and the high gear. The position of the sliding sleeve 51 shown by the solid line is the neutral gear, and the position shown by the dashed line is the high gear.

Figure 3:
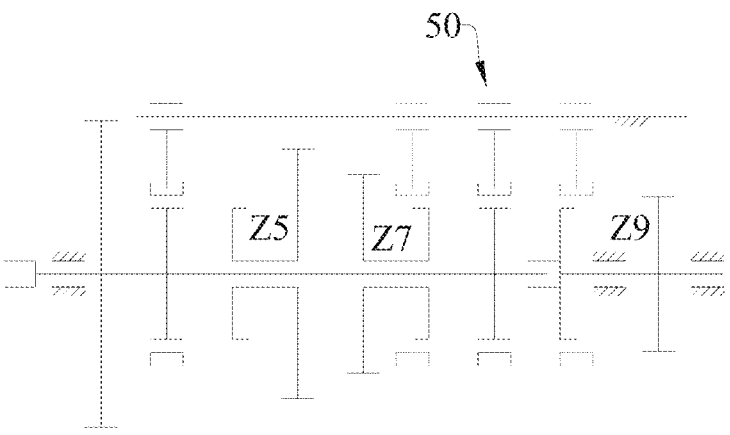
FIG. 3 is a schematic structural diagram of a middle gear shifting and a low gear shifting of a gearbox according to an embodiment of the present disclosure.

As shown in FIG. 3, the sliding sleeve 51 located between the middle gear Z7 and the low gear Z9 has three combined states, namely, the middle gear, the neutral gear and the low gear. The position of the sliding sleeve 51 shown by the solid line is the neutral gear, the position shown by dashed line on the left is the neutral gear and the position shown by dashed line on the right is the low gear.

Since each of the two driver components has the above structure, as shown in Table 1, there are thirty-six (namely, 2×2×3×3=36) combinations. Considering the functional characteristics of the gearbox itself, two gears cannot be engaged on the same shaft at the same time, otherwise the gear meshing interference will cause the gearbox to be stuck and the power cannot be transmitted normally. Therefore, the two sliding sleeves 51 in each drive assembly cannot be engaged in gears at the same time. After excluding the related combinations in Table 1, combined with Table 2, there are only sixteen combinations left.

Considering that in the embodiment of the present disclosure, the two power transmission routes are symmetrically arranged in the housing, in the above 16 combinations, the high gear sliding sleeve 51 in one drive assembly of partial combination has the same effect as the high gear sliding sleeve 51 in the other drive assembly; and in some combinations, the middle and low shift sliding sleeve 51 in one drive assembly has the same effect as the middle and low shift sliding sleeve 51 in another drive assembly. After excluding this combination, as shown in Table 3, there are ten combinations left.

As shown in Table 4, after excluding the impractical combination of high and low gears simultaneously, there are nine combinations left. By associating these nine combinations with control strategies, nine shift states can be formed. As shown in FIG. 4, taking five of these states as shift states and the other four as transition states in the shift process, therefore, a five-gear gearbox can be formed.

New energy automobiles, especially large tonnage new energy commercial vehicles, use a drive electric machine that can have a large speed change range when the electric machine is at constant power, and a gearbox with fewer gears can meet the speed change requirements; at the same time, fewer gear changes during driving can greatly reduce the failure rate of gear selection of the gearbox and improve the reliability of driving.

Therefore, the new energy commercial vehicles are more suitable for the gearbox with three to four gears. As shown in FIG. 5, three intermediate gears in the five-gear gearbox can be used as common gears, and the remaining two gears can be used as a short transition state, therefore, a three-gear gearbox with few gears can be formed, which is very suitable for pure electric commercial vehicles.

It should be noted that the upper side and the lower side in the following tables mean that the upper drive assembly is the upper side and the lower drive assembly is the lower side according to the view shown in FIG. 1. In the two sliding sleeves of the upper drive assembly, the sliding sleeve close to the high gear Z5 is the upper high gear sliding sleeve, and the sliding sleeve between the middle gear Z7 and the low gear Z9 is the upper middle and low gear sliding sleeve; and correspondingly, in the two sliding sleeves of the lower drive assembly, the sliding sleeve close to the high gear Z5 is the lower high gear sliding sleeve, and the sliding sleeve between the middle gear Z7 and the low gear Z9 is the lower middle and low gear sliding sleeve.

TABLE 1

| | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|
| | Neutral gear | High gear | Neutral gear | High gear | Middle gear | Neutral gear | Low gear | Middle gear | Neutral gear | Low gear |
| Combination 1 | ✓ | — | ✓ | — | ✓ | — | — | ✓ | — | — |
| Combination 2 | ✓ | — | ✓ | — | ✓ | — | — | — | ✓ | — |
| Combination 3 | ✓ | — | ✓ | — | ✓ | — | — | — | — | ✓ |
| Combination 4 | ✓ | — | ✓ | — | — | ✓ | — | ✓ | — | — |
| Combination 5 | ✓ | — | ✓ | — | — | ✓ | — | — | ✓ | — |
| Combination 6 | ✓ | — | ✓ | — | — | ✓ | — | — | — | ✓ |
| Combination 7 | ✓ | — | ✓ | — | — | — | ✓ | ✓ | — | — |
| Combination 8 | ✓ | — | ✓ | — | — | — | ✓ | — | ✓ | — |
| Combination 9 | ✓ | — | ✓ | — | — | — | ✓ | — | — | ✓ |
| Combination 10 | ✓ | — | — | ✓ | ✓ | — | — | ✓ | — | — |
| Combination 11 | ✓ | — | — | ✓ | ✓ | — | — | — | ✓ | — |

TABLE 1-continued

| | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|
| | Neutral gear | High gear | Neutral gear | High gear | Middle gear | Neutral gear | Low gear | Middle gear | Neutral gear | Low gear |
| Combination 12 | ✓ | — | — | ✓ | ✓ | — | — | — | — | ✓ |
| Combination 13 | ✓ | — | — | ✓ | — | ✓ | — | ✓ | — | — |
| Combination 14 | ✓ | — | — | ✓ | — | ✓ | — | — | ✓ | — |
| Combination 15 | ✓ | — | — | ✓ | — | ✓ | — | — | — | ✓ |
| Combination 16 | ✓ | — | — | ✓ | — | — | ✓ | ✓ | — | — |
| Combination 17 | ✓ | — | — | ✓ | — | — | ✓ | — | ✓ | — |
| Combination 18 | ✓ | — | — | ✓ | — | — | ✓ | — | — | ✓ |
| Combination 19 | — | ✓ | ✓ | — | ✓ | — | — | ✓ | — | — |
| Combination 20 | — | ✓ | ✓ | — | ✓ | — | — | — | ✓ | — |
| Combination 21 | — | ✓ | ✓ | — | ✓ | — | — | — | — | ✓ |
| Combination 22 | — | ✓ | ✓ | — | — | ✓ | — | ✓ | — | — |
| Combination 23 | — | ✓ | ✓ | — | — | ✓ | — | — | ✓ | — |
| Combination 24 | — | ✓ | ✓ | — | — | ✓ | — | — | — | ✓ |
| Combination 25 | — | ✓ | ✓ | — | — | — | ✓ | ✓ | — | — |
| Combination 26 | — | ✓ | ✓ | — | — | — | ✓ | — | ✓ | — |
| Combination 27 | — | ✓ | ✓ | — | — | — | ✓ | — | — | ✓ |
| Combination 28 | — | ✓ | — | ✓ | ✓ | — | — | ✓ | — | — |
| Combination 29 | — | ✓ | — | ✓ | ✓ | — | — | — | ✓ | — |
| Combination 30 | — | ✓ | — | ✓ | ✓ | — | — | — | — | ✓ |
| Combination 31 | — | ✓ | — | ✓ | — | ✓ | — | ✓ | — | — |
| Combination 32 | — | ✓ | — | ✓ | — | ✓ | — | — | ✓ | — |
| Combination 33 | — | ✓ | — | ✓ | — | ✓ | — | — | — | ✓ |
| Combination 34 | — | ✓ | — | ✓ | — | — | ✓ | ✓ | — | — |
| Combination 35 | — | ✓ | — | ✓ | — | — | ✓ | — | ✓ | — |
| Combination 36 | — | ✓ | — | ✓ | — | — | ✓ | — | — | ✓ |

Notes:
"✓" represents that the gear is engaged, and "—" represents that the gear is not engaged

TABLE 2

| | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|
| | Neutral gear | High gear | Neutral gear | High gear | Middle gear | Neutral gear | Low gear | Middle gear | Neutral gear | Low gear |
| Combination 1 | ✓ | — | ✓ | — | ✓ | — | — | ✓ | — | — |
| Combination 2 | ✓ | — | ✓ | — | ✓ | — | — | — | ✓ | — |
| Combination 3 | ✓ | — | ✓ | — | ✓ | — | — | — | — | ✓ |
| Combination 4 | ✓ | — | ✓ | — | — | ✓ | — | ✓ | — | — |
| Combination 5 | ✓ | — | ✓ | — | — | ✓ | — | — | ✓ | — |
| Combination 6 | ✓ | — | ✓ | — | — | ✓ | — | — | — | ✓ |
| Combination 7 | ✓ | — | ✓ | — | — | — | ✓ | ✓ | — | — |
| Combination 8 | ✓ | — | ✓ | — | — | — | ✓ | — | ✓ | — |
| Combination 9 | ✓ | — | ✓ | — | — | — | ✓ | — | — | ✓ |
| Combination 10 | ✓ | — | — | ✓ | ✓ | — | — | — | ✓ | — |
| Combination 11 | ✓ | — | — | ✓ | — | ✓ | — | — | ✓ | — |
| Combination 12 | ✓ | — | — | ✓ | — | — | ✓ | — | ✓ | — |
| Combination 13 | — | ✓ | ✓ | — | — | ✓ | — | ✓ | — | — |
| Combination 14 | — | ✓ | ✓ | — | — | ✓ | — | — | ✓ | — |
| Combination 15 | — | ✓ | ✓ | — | — | ✓ | — | — | — | ✓ |
| Combination 16 | — | ✓ | — | ✓ | — | ✓ | — | — | ✓ | — |

Notes:
"✓" represents that the gear is engaged, and "—" represents that the gear is not engaged

TABLE 3

| | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|
| | Neutral gear | High gear | Neutral gear | High gear | Middle gear | Neutral gear | Low gear | Middle gear | Neutral gear | Low gear |
| Combination 1 | ✓ | — | ✓ | — | ✓ | — | — | ✓ | — | — |
| Combination 2 | ✓ | — | ✓ | — | ✓ | — | — | — | ✓ | — |
| Combination 3 | ✓ | — | ✓ | — | ✓ | — | — | — | — | ✓ |
| Combination 4 | ✓ | — | ✓ | — | — | ✓ | — | — | ✓ | — |
| Combination 5 | ✓ | — | ✓ | — | — | ✓ | — | — | — | ✓ |
| Combination 6 | ✓ | — | ✓ | — | — | — | ✓ | — | — | ✓ |
| Combination 7 | ✓ | — | — | ✓ | ✓ | — | — | — | ✓ | — |
| Combination 8 | ✓ | — | — | ✓ | — | ✓ | — | — | ✓ | — |
| Combination 9 | ✓ | — | — | ✓ | — | — | ✓ | — | ✓ | — |
| Combination 10 | — | ✓ | — | ✓ | — | ✓ | — | — | ✓ | — |

Notes:
"✓" represents that the gear is engaged, and "—" represents that the gear is not engaged

TABLE 4

| | Upper high gear sliding sleeve | | Lower high gear sliding sleeve | | Upper middle and low gear sliding sleeve | | | Lower middle and low gear sliding sleeve | | |
|---|---|---|---|---|---|---|---|---|---|---|
| | Neutral gear | High gear | Neutral gear | High gear | Middle gear | Neutral gear | Low gear | Middle gear | Neutral gear | Low gear |
| Combination 1 | ✓ | — | ✓ | — | ✓ | — | — | ✓ | — | — |
| Combination 2 | ✓ | — | ✓ | — | ✓ | — | — | — | ✓ | — |
| Combination 3 | ✓ | — | ✓ | — | ✓ | — | — | — | — | ✓ |
| Combination 4 | ✓ | — | ✓ | — | — | ✓ | — | — | ✓ | — |
| Combination 5 | ✓ | — | ✓ | — | — | ✓ | — | — | — | ✓ |
| Combination 6 | ✓ | — | ✓ | — | — | — | ✓ | — | — | ✓ |
| Combination 7 | ✓ | — | — | ✓ | ✓ | — | — | — | ✓ | — |
| Combination 8 | ✓ | — | — | ✓ | — | ✓ | — | — | ✓ | — |
| Combination 9 | — | ✓ | — | ✓ | — | ✓ | — | — | ✓ | — |

Notes:
"✓" represents that the gear is engaged, and "—" represents that the gear is not engaged It should be noted that the gearbox of the present disclosure can be applied to transport vehicles with functions similar to those of electric commercial vehicles, other electric vehicles, hybrid vehicles, tricycles, or other vehicles.

In addition, the above assemblies are main key assemblies in the gearbox, and other assemblies such as housings, bearings, oil seals and bolts are not listed one by one, and their functions are inherent functions of respective assemblies.

The embodiment of the present disclosure also provides a vehicle, including the gearbox in the above-mentioned technical solution. The specific functional implementation of the vehicle provided in this embodiment can be found in the description of the gearbox mentioned above, which will not be repeated here.

In the description of this specification, the description of the terms "one embodiment/implementation", "some embodiments/implementations", "example", "specific example" or "some examples" means that the specific features, structures, materials or characteristics described with reference to the embodiment/implementation or embodiment are included in at least one embodiment/implementation or example of this application. In this specification, the illustrative expressions of the above terms are not intended to refer to the same embodiment/implementation or example. Moreover, the particular features, structures, materials or characteristics described may be combined in any suitable manner in any one or more embodiments/implementations or examples. In addition, those skilled in the art may combine different embodiments/implementations described herein or examples or features in different embodiments/implementations or examples without any contradiction.

In addition, the terms such as "first" and "second" are only used for the purpose of description, rather than being understood to indicate or imply relative importance or hint the number of indicated technical features. Therefore, the features limited by "first" and "second" can explicitly or impliedly include at least one feature. In the description of the present disclosure, the meaning of "a plurality of" means at least two, for example, two or three, unless otherwise clearly and specifically limited.

Those skilled in the art should understand that the foregoing implementations are merely intended to describe the present disclosure clearly, rather than to limit the scope of the present disclosure. Those skilled in the art may make other changes or modifications based on the foregoing disclosure, but these changes or modifications should fall within the scope of the present disclosure.

The invention claimed is:

1. A gearbox, being applicable to new energy automobiles without power interruption, comprising an output shaft and two drive assemblies, wherein each of the two drive assemblies is used to drive the output shaft;

the drive assembly comprises an electric machine, a reduction gear set, and a gear transmission assembly in transmission connection with the output shaft, and the electric machine is in transmission connection with the gear transmission assembly through the reduction gear set;

the gear transmission assembly comprises at least three gear pairs, and transmission ratios of respective gear pairs in the at least three gear pairs are different; and in response to the gearbox being in a first transmission mode, the reduction gear set is in transmission connection with the output shaft through one of the at least three gear pairs, wherein the drive assembly further comprises a shift shaft and an intermediate shaft parallel to the shift shaft;

the shift shaft and an input shaft of the electric machine are coaxially arranged, and the input shaft of the electric machine is in transmission connection with the shift shaft through the reduction gear set and the intermediate shaft; and the reduction gear set comprises two gears arranged on the intermediate shaft, and a gear arranged on the input shaft and a gear arranged on the shift shaft are respectively in meshed connection with corresponding gears arranged on the intermediate shaft.

2. The gearbox according to claim 1, wherein the two drive assemblies are symmetrically arranged with respect to a central axis of the output shaft.

3. The gearbox according to claim 1, wherein an end of the intermediate shaft facing away from the reduction gear set is used to transmit power to a power take-off.

4. The gearbox according to claim 1, wherein the drive assembly comprises at least two sliding sleeve shift mechanisms, and the at least two sliding sleeve shift mechanisms are slidably sleeved on the shift shaft;

in response to the gearbox being in the first transmission mode, one of the at least two sliding sleeve shift mechanisms is in transmission connection with a corresponding gear pair in the at least three gear pairs; and in response to the gearbox being in a second transmission mode, for one of the two drive assemblies, the at least two sliding sleeve shift mechanisms are in transmission disconnection with the at least three gear pairs.

5. The gearbox according to claim 4, wherein each of the at least two sliding sleeve shift mechanisms further comprises a shift fork shaft arranged in parallel with the shift shaft, and the shift fork is slidably sleeved on the shift fork shaft.

6. The gearbox according to claim 4, wherein each of the at least two sliding sleeve shift mechanisms comprises a sliding sleeve and a shift fork, and the sliding sleeve is slidably sleeved on the shift shaft; and the shift fork is used to drive the sliding sleeve to be in transmission connection with the gear arranged on the shift shaft in the corresponding gear pair in the first transmission mode, and to drive the sliding sleeve to be in transmission disconnection with the gear arranged on the shift shaft in the corresponding gear pair in the second transmission mode.

7. The gearbox according to claim 6, wherein the gearbox further comprises a shift control unit electrically connected to the sliding sleeve shift mechanism, the shift control unit comprises a controller and a shifter electrically connected to the sliding sleeve shift mechanism, and the controller communicates with the shifter.

8. The gearbox according to claim 6, wherein the shift shaft comprises a first shaft section and a second shaft section coaxially arranged with the first shaft section, and a gear of the gear pair arranged on the second shaft section has a bearing hole for supporting an end of the second shaft section; and at least one of the at least two sliding sleeve shift mechanisms is slidably arranged at a position of the first shaft section close to the second shaft section.

9. A vehicle, comprising the gearbox according to claim 1.

10. The vehicle according to claim 9, wherein the two drive assemblies are symmetrically arranged with respect to a central axis of the output shaft.

11. The vehicle according to claim 9, wherein an end of the intermediate shaft facing away from the reduction gear set is used to transmit power to a power take-off.

12. The vehicle according to claim 9, wherein the drive assembly comprises at least two sliding sleeve shift mechanisms, and the at least two sliding sleeve shift mechanisms are slidably sleeved on the shift shaft;

in response to the gearbox being in the first transmission mode, one of the at least two sliding sleeve shift mechanisms is in transmission connection with a corresponding gear pair in the at least three gear pairs; and in response to the gearbox being in a second transmission mode, for one of the two drive assemblies, the at least two sliding sleeve shift mechanisms are in transmission disconnection with the at least three gear pairs.

13. The vehicle according to claim 12, wherein each of the at least two sliding sleeve shift mechanisms comprises a sliding sleeve and a shift fork, and the sliding sleeve is slidably sleeved on the shift shaft; and the shift fork is used to drive the sliding sleeve to be in transmission connection with the gear arranged on the shift shaft in the corresponding gear pair in the first transmission mode, and to drive the sliding sleeve to be in transmission disconnection with the gear arranged on the shift shaft in the corresponding gear pair in the second transmission mode.

14. The vehicle according to claim 12, wherein each of the at least two sliding sleeve shift mechanisms further comprises a shift fork shaft arranged in parallel with the shift shaft, and the shift fork is slidably sleeved on the shift fork shaft.

15. The vehicle according to claim 14, wherein the gearbox further comprises a shift control unit electrically connected to the sliding sleeve shift mechanism, the shift control unit comprises a controller and a shifter electrically connected to the sliding sleeve shift mechanism, and the controller communicates with the shifter.

16. The vehicle according to claim 14, wherein the shift shaft comprises a first shaft section and a second shaft section coaxially arranged with the first shaft section, and a gear of the gear pair arranged on the second shaft section has a bearing hole for supporting an end of the second shaft section; and at least one of the at least two sliding sleeve shift mechanisms is slidably arranged at a position of the first shaft section close to the second shaft section.

* * * * *